(12) United States Patent
Horishita (10) Patent No.: US 6,744,961 B2
(45) Date of Patent: Jun. 1, 2004

(54) OPTICAL MODULE WITH METAL CASING ACCOMMODATING ELECTRICALLY INSULATIVE HOLDER FOR HOLDING SEMICONDUCTOR PACKAGE

(75) Inventor: Masakazu Horishita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/193,065

(22) Filed: Jul. 12, 2002

(65) Prior Publication Data

US 2003/0133685 A1 Jul. 17, 2003

(30) Foreign Application Priority Data

Jan. 16, 2002 (JP) .......................................... 2002-007815

(51) Int. Cl.⁷ .............................. G02B 6/00; G02B 6/36
(52) U.S. Cl. ......................... 385/134; 385/136; 385/88
(58) Field of Search ................................. 385/134, 136, 385/88, 92, 94

(56) References Cited

U.S. PATENT DOCUMENTS 5,596,665 A * 1/1997 Kurashima et al. ........... 385/92
5,875,047 A * 2/1999 Abe et al. .................... 359/152
2003/0118293 A1 * 6/2003 Canace et al. ................ 385/92

FOREIGN PATENT DOCUMENTS

| JP | 9-260693 | 10/1997 |
| JP | 9-292549 | 11/1997 |

* cited by examiner

Primary Examiner—Chandrika Prasad
(74) Attorney, Agent, or Firm—Staas & Halsey LLP

(57) ABSTRACT

An optical module includes a semiconductor package, a holder holding the semiconductor package, and a metal casing having a bottom surface, first and second confronting sidewalls, and third and fourth confronting sidewalls. The first sidewall has a pair of parallel edges defining a cutout extending to the bottom surface. The holder is accommodated within the metal casing on the bottom surface in a state where the metal casing is positioned by the pair of parallel edges, the third and fourth sidewalls and the bottom surface, so that the semiconductor package extends outside the metal casing via the cutout.

20 Claims, 11 Drawing Sheets

OPTICAL MODULE WITH METAL CASING ACCOMMODATING ELECTRICALLY INSULATIVE HOLDER FOR HOLDING SEMICONDUCTOR PACKAGE

BACKGROUND OF THE INVENTION

This application claims the benefit of a Japanese Patent Application No. 2002-007815 filed Jan. 16, 2002, in the Japanese Patent Office, the disclosure of which is hereby incorporated by reference.

1. Field of the Invention

The present invention generally relates to optical modules, and more particularly to an optical module which is made up of a semiconductor package and a metal casing, where the semiconductor package is provided with a semiconductor optical element and a metal base which is connected to the metal casing while maintaining an insulated state with respect to the metal casing.

2. Description of the Related Art

Figure 1A:
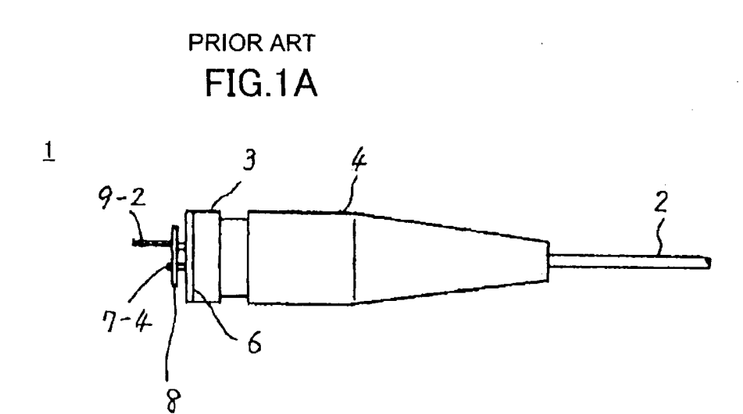
FIGS. 1A through 1C are diagrams for explaining an example of a semiconductor package.
Figure 1B:
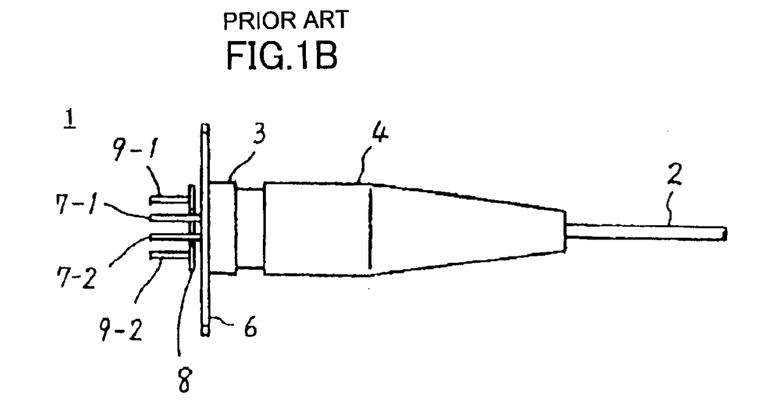
Figure 1C:
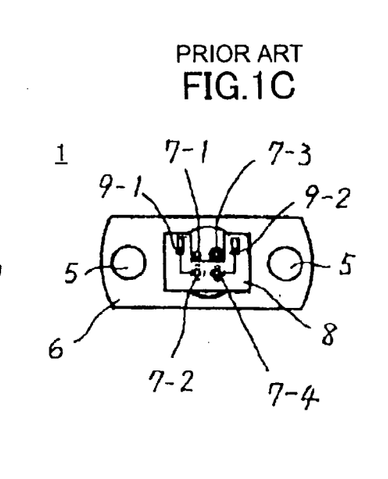

FIGS. 1A through 1C are diagrams for explaining an example of a semiconductor package. FIG. 1A shows a side view of a semiconductor package 1, FIG. 1B shows a plan view of the semiconductor package 1, and FIG. 1C shows a rear view of the semiconductor package 1. The semiconductor package 1 has a well known internal structure, and a description and illustration thereof will be omitted.

The semiconductor package 1 has a vacuum structure inside, and an optical element is mounted inside the semiconductor package 1 so that the optical element can optically couple to an optical fiber 2 which extends outside from a tip end of the semiconductor package 1. In order to achieve the vacuum structure and to maintain a sufficient mechanical strength, a circular base 3 is made of a metal. A cover 4 covers the tip end periphery of the semiconductor package 1. This cover is made of a synthetic resin, and has a generally cone shape towards the optical fiber 2.

A flange 6 having holes 5 used for mounting is provided on the base 3. For example, this flange is formed by removing top and bottom portions of a circular plate. As shown in FIG. 1C, four terminals 7-1 through 7-4 extend outwardly from the flange 6. The terminal 7-1 directly penetrates the metal portion of the base 3. The other terminals 7-2 through 7-4 are electrically insulated with respect to the base 3. Accordingly, the terminal 7-1 also functions as a ground (GND) terminal which is electrically connected to the base 3.

As shown in FIG. 1C, the terminals 7-2 and 7-4 are connected to a connection pattern on a terminal plate 8 by soldering. The terminal plate 8 is formed by a printed circuit board. The terminals 7-2 and 7-4 are connected to corresponding terminals 9-1 and 9-2 on both sides of the terminal plate 8 via a wiring pattern on the terminal plate 8. The terminals 7-1 and 7-3 extend via a cutout in the terminal plate 8. As may be seen from FIGS. 1A and 1B, the terminals 7-1 and 7-3 and the terminals 9-1 and 9-2 of the terminal plate 8 are arranged linearly in a horizontal direction.

Conventionally, in the optical module for use in optical transmission at a high bit rate of 600 Mbps or higher, a power supply voltage of a driving integrated circuit (IC) for driving the optical element such as a laser diode is −5 V. For this reason, the terminal 7-1 and the base 3 are electrically connected as shown in FIGS. 1A through 1C so as to connect an anode circuit terminal and the base 3.

When combining the semiconductor package 1 and a driving LSI using a negative power supply voltage, the semiconductor package 1 is mounted on the metal casing so that the cathode of the laser diode is connected to −5 V, for example, and the anode of the laser diode is connected to the ground (GND).

Recently, the driving IC for driving the laser diode uses a CMOS structure when transmitting at a high bit rate, and it has become possible to drive the laser diode using a power supply voltage of +3 V, for example. Hence, the laser diode of the semiconductor package 1 shown in FIGS. 1A through 1C which is conventionally combined with the driving IC using the negative power supply voltage, needs to be combined with the driving IC using a positive power supply voltage. But according to the conventional mounting method, the entire metal casing of the optical module including the semiconductor package 1 will have the potential of the positive power supply voltage.

More particularly, the terminals are connected so that the positive power supply voltage of an anode circuit of the laser diode is connected to the ground (GND) terminal 7-1, a cathode circuit of the laser diode is connected to the terminal 7-2 (9-1), and a monitoring photodiode for controlling light emission of the laser diode is connected to the terminals 7-3 and 7-4 (9-2).

When mounting the optical module described above on an apparatus, the terminal 7-1 is connected to a ground circuit of the apparatus, which would in turn short-circuit the power supply. Accordingly, it is necessary to electrically insulate the optical module. It is conceivable to form the metal casing by an electrically insulative material such as a synthetic resin, but the resistance of the circuit against electromagnetic noise deteriorates if the casing is not made of a metal.

Figure 2A:
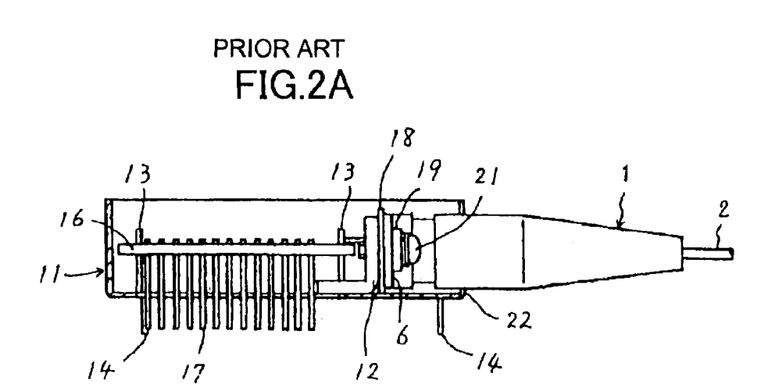
FIGS. 2A through 2C are diagrams for explaining the semiconductor package mounted on a metal casing.
Figure 2B:
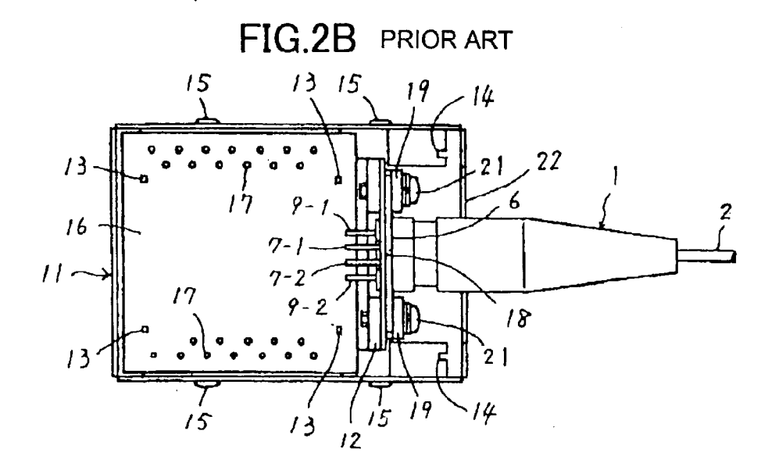
Figure 2C:
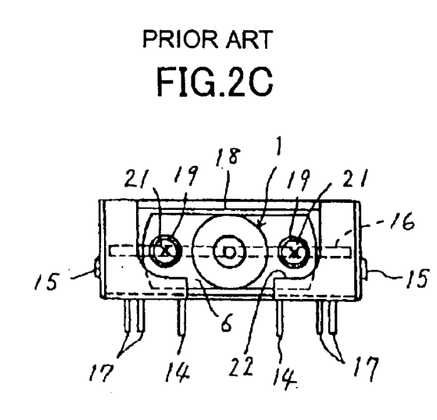

FIGS. 2A through 2C are diagrams for explaining the semiconductor package 1 mounted on a metal casing 11. FIG. 2A shows a side view in cross section of the semiconductor package 1 and the metal casing 11, FIG. 2B shows a plan view of the semiconductor package 1 and the metal casing 11, and FIG. 2C shows a front view of the semiconductor package 1 and the metal casing 11.

The metal casing 2 has a box shape which is formed by bending four sides of a plate member such as a steel plate. An L-shaped metal fitting 12 is provided inside on the bottom surface of the metal casing 11 by soldering, for example. Four mounting terminals 13 with stepped portions extend inwards by being bent from the bottom surface of the metal casing 11, and four mounting terminals 14 extend outwards by being bent from the bottom surface of the metal casing 11. A pair of engaging projections 15 is press-molded on each of the two sidewalls of the metal casing 11. The entire metal casing 11 is subjected to a suitable rust-proofing process, such as nickel plating, which permits soldering thereon.

The mounting terminals 13 fit into corresponding through holes formed in a conductor pattern formed on a printed circuit board 16. The printed circuit board 16 is positioned to a predetermined height from the bottom surface of the metal casing 11 by the stepped portions of the mounting terminals 13. The mounting terminals 13 are soldered onto the conductor pattern in the state where the printed circuit board 16 is positioned. A plurality of lead terminals 17 are arranged in parallel on both sides of the printed circuit board 16, and these lead terminals 17 extend outside via cutouts formed in the bottom surface of the metal casing 11. Various circuit parts and circuit patterns are provided on the printed circuit board 16, but the illustration thereof is omitted in FIGS. 2A through 2C so as to simplify the drawing.

The flange 6 of the semiconductor package 1 connects to a vertical surface of the metal fitting 12 via an insulator plate 18 which is made of an electrically insulative material such as a synthetic resin. Screws 21 are inserted through the holes 5 via an insulator bush 19 made of a synthetic resin, from the front side of the flange 6, and are screwed into screw holes in the metal fitting 12, so that the flange 6 is fixed to the metal fitting 12. Accordingly, the flange 6 of the base 3 of the semiconductor package 1 is mounted with respect to the metal casing 11 in a state making no electrical contact to the metal casing 11. The tip end of the semiconductor package 1 projects outside the metal casing 11 towards the front side via a cutout 22 which is formed at the front side of the metal casing 11.

Figure 3A:
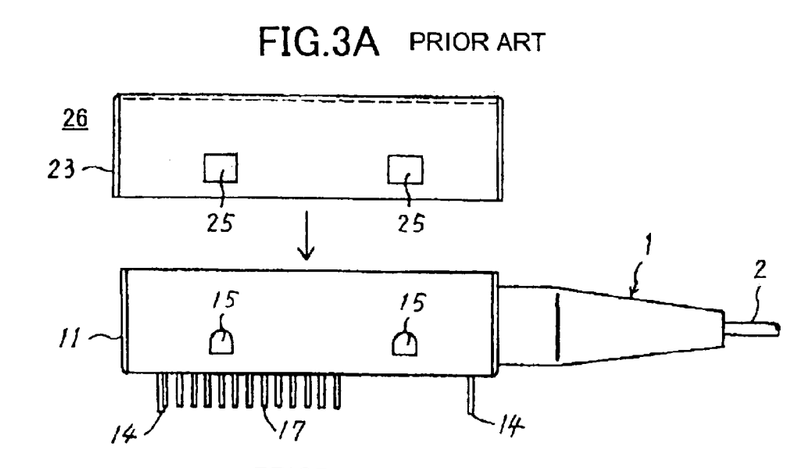
FIGS. 3A through 3C are diagrams for explaining a state where a metal cover is mounted on the structure shown in FIGS. 2A through 2C.
Figure 3B:
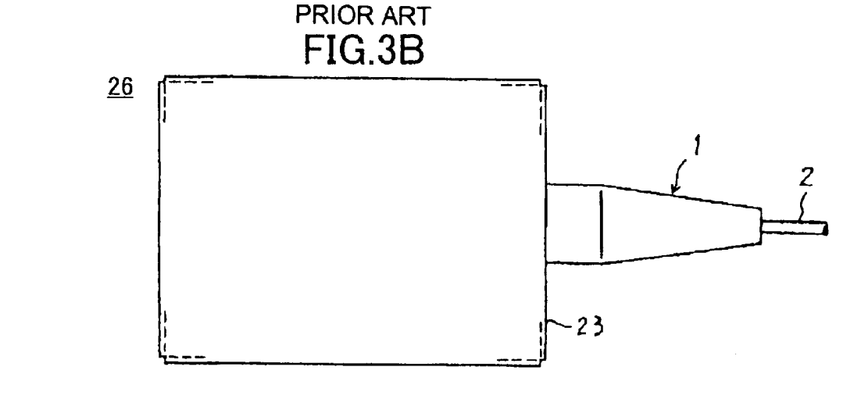
Figure 3C:
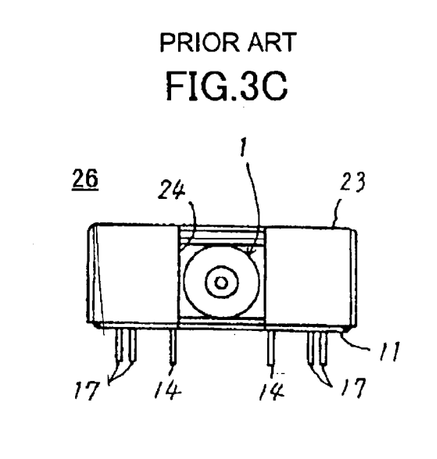

FIGS. 3A through 3C are diagrams for explaining a state where a metal cover is mounted on the structure shown in FIGS. 2A through 2C. FIG. 3A shows a side view of the structure, and FIG. 3B shows a plan view of the structure, and FIG. 3C shows a front view of FIG. 3A. The structure is shown with a metal cover 23 mounted on the metal casing 11 in FIGS. 3B and 3C.

The metal cover 23 has a box shape which is formed by bending four sides of a plate member such as a steel plate, similarly to the metal casing 11. A cutout 24 for permitting the semiconductor package 1 to project towards the front side, and rectangular holes 25 for receiving the engaging projections 15 on the sidewalls of the metal casing 11 are formed in the metal cover 23. The metal cover 23 is subjected to a suitable rust-proofing process.

The metal cover 23 has an internal surface shape which suitably matches an outer surface shape of the metal casing 11 when the metal cover 23 is fitted on the metal casing 11. Hence, when the metal cover 23 is slid in a direction indicated by an arrow in FIG. 3A and fitted on the metal casing 11, the metal cover 23 connects to the metal casing 11 as shown in FIGS. 3B and 3C. When the metal cover 23 is connected to the metal casing 11, all of the engaging projections 15 of the metal casing 11 engage the corresponding rectangular holes 25 in the metal cover 23, so as to positively hold the metal cover 23 and the metal casing 11 together. In this connected state, the tip end of the semiconductor package 1 projects towards the front side of the metal cover 23 via the cutout 24. The metal cover 23 can be removed from the metal casing 11 by outwardly spreading the sidewalls of the metal cover 23 and pulling the metal cover 23 with respect to the metal casing 11.

When mounting the optical module 26 on the printed circuit board or the like of the apparatus, the mounting terminals 14 of the metal casing 11 and the lead terminals 17 of the printed circuit board 16 are inserted into corresponding through holes in the printed circuit board of the apparatus. The terminals 14 and 17 are then soldered to wiring patterns on the printed circuit board of the apparatus.

As described above in conjunction with FIGS. 2A through 2C, the metal casing 11 and the base 3 of the semiconductor package 1 must be electrically insulated. For this reason, the insulator plate 18 and the insulator bush 19 are inserted between the metal fitting 12 and the flange 6 of the semiconductor package 1 when fixing the semiconductor package 1 to the metal casing 11 by the screws 21. However, since the parts are small and complex in structure, there was a problem in that it requires a troublesome and time-consuming operation to assemble such parts.

SUMMARY OF THE INVENTION

Accordingly, it is a general object of the present invention to provide a novel and useful optical module in which the problems described above are eliminated.

Another and more specific object of the present invention is to provide an optical module which can be assembled quickly by a relatively simple assembling operation.

Still another object of the present invention is to provide an optical module comprising a semiconductor package, a holder holding the semiconductor package, and a metal casing having a bottom surface, first and second confronting sidewalls, and third and fourth confronting sidewalls, where the first sidewall has a pair of parallel edges defining a cutout extending to the bottom surface, the holder is accommodated within the metal casing on the bottom surface in a state where the metal casing is positioned by the pair of parallel edges, the third and fourth sidewalls and the bottom surface, so that the semiconductor package extends outside the metal casing via the cutout. According to the optical module of the present invention, the optical module can be assembled quickly by a relatively simple assembling operation, without requiring special equipments or tools.

A further object of the present invention is to provide an optical module comprising a semiconductor package having a metal base, a flange and a semiconductor light emitting element which outputs an optical signal, a holder holding a periphery of the metal base of the semiconductor package, and a metal casing having a bottom surface and four sidewalls to accommodate the holder together with the semiconductor package, where one of the sidewalls has a pair of parallel edges defining a cutout extending to the bottom surface, the holder is made up of a pair of holder halves sandwiching the semiconductor package, each of the holder halves has a recess which positions the flange of the semiconductor package, a groove which receives the pair of parallel edges of the metal casing, and engaging portions which engage corresponding engaging portions of the other holder half when the pair of holder halves connect to form the holder, and the holder is electrically insulative at least at portions making contact with the metal base of the semiconductor package. According to the optical module of the present invention, the optical module can be assembled quickly by a relatively simple assembling operation, without requiring special equipments or tools.

Another object of the present invention is to provide an optical module comprising a semiconductor package having a metal base, a flange and a semiconductor light emitting element which outputs an optical signal, a holder holding a periphery of the metal base of the semiconductor package, and a metal casing having a bottom surface and four sidewalls to accommodate the holder together with the semiconductor package, where one of the sidewalls has a pair of parallel edges defining a cutout extending to the bottom surface, the holder is made up of a pair of holder halves made of a synthetic resin and sandwiching the semiconductor package, and each of the holder halves has a recess which positions the flange of the semiconductor package, a groove which receives the pair of parallel edges of the metal casing, and engaging portions which engage corresponding engaging portions of the other holder half when the pair of holder halves connect to form the holder. According to the optical module of the present invention, the optical module can be assembled quickly by a relatively simple assembling operation, without requiring special equipments or tools.

Still another object of the present invention is to provide an optical module comprising a semiconductor package having a metal base, a flange and a semiconductor light emitting element which outputs an optical signal, a holder holding a periphery of the metal base of the semiconductor package, and a metal casing having a bottom surface and four sidewalls to accommodate the holder together with the semiconductor package, where one of the sidewalls having a pair of parallel edges defining a cutout extending to the bottom surface, the holder is made up of a pair of holder halves sandwiching the semiconductor package, each of the holder halves has a recess which positions the flange of the semiconductor package, a groove which receives the pair of parallel edges of the metal casing, and engaging portions which engage corresponding engaging portions of the other holder half when the pair of holder halves connect to form the holder, and the holder is electrically insulative at least at portions making contact with metal portions of the semiconductor package and including the flange of the semiconductor package. According to the optical module of the present invention, the optical module can be assembled quickly by a relatively simple assembling operation, without requiring special equipments or tools.

Other objects and further features of the present invention will be apparent from the following detailed description when read in conjunction with the accompanying drawings.

DESCRIPTION OF THE PREFERRED EMBODIMENTS

A description will be given of an embodiment of an optical module according to the present invention. It is assumed for the sake of convenience that this embodiment of the optical module uses the semiconductor package 1 shown in FIGS. 1A through 1C. Hence, in the following description, those parts which are the same as those corresponding parts in FIGS. 1A through 1C are designated by the same reference numerals, and a description thereof will be omitted.

Figure 4A:
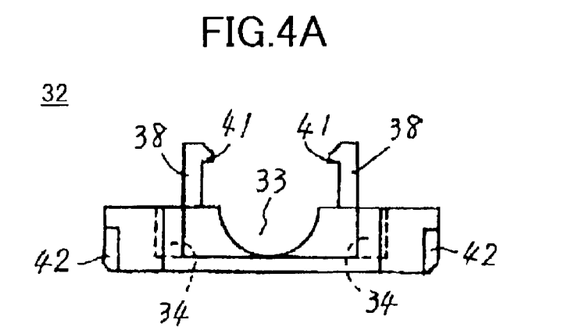
FIGS. 4A through 4E are diagrams for explaining holder halves.
Figure 4B:
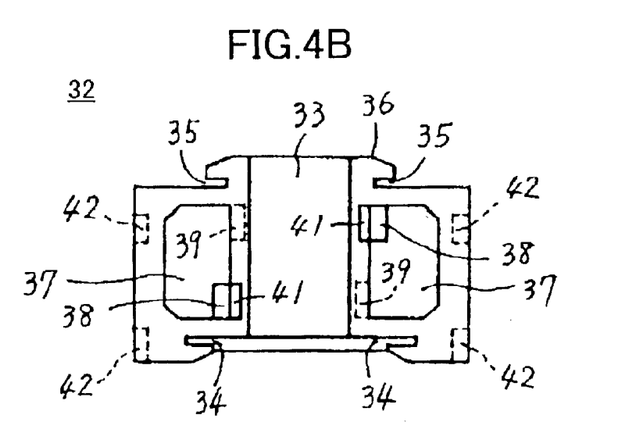
Figure 4C:
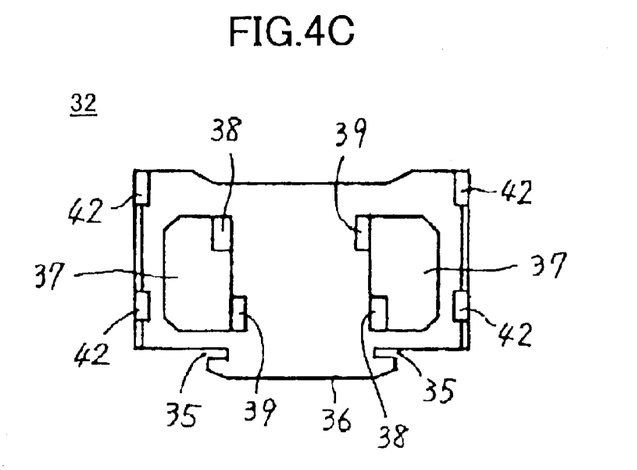
Figure 4D:
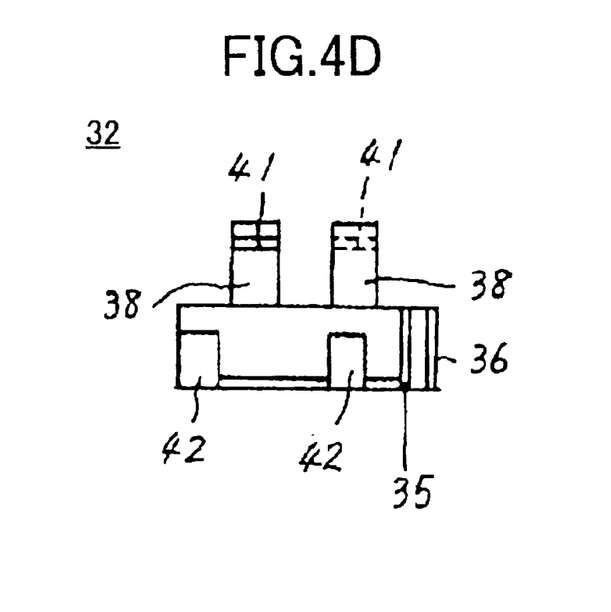
Figure 4E:
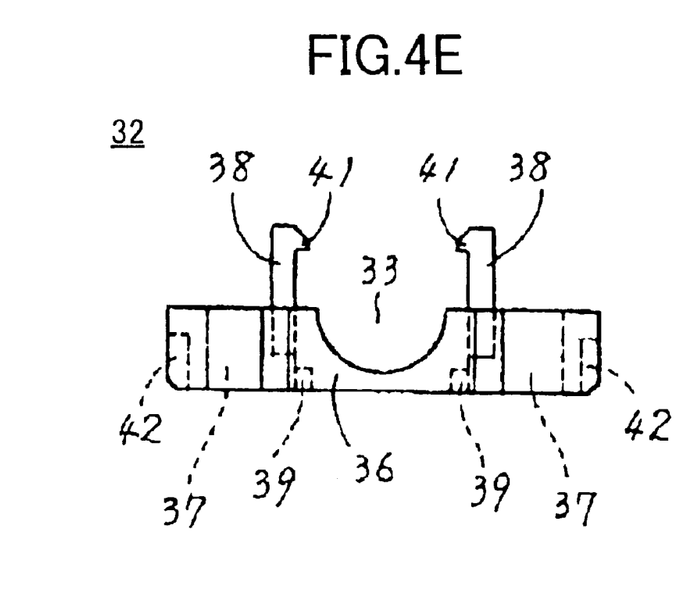

FIGS. 4A through 4E are diagrams for explaining holder halves 32. The holder halves 32 form a holder which holds the semiconductor package 1 shown in FIGS. 1A through 1C described above. FIG. 4A shows a rear view of the holder half 32, FIG. 4B shows a plan view of the holder half 32, FIG. 4C shows a bottom view of the holder half 32, FIG. 4D shows a side view of the holder half 32, and FIG. 4E shows a front view of the holder half 32.

The holder half 32 has suitable resiliency and mechanical strength, and is sufficiently electrically insulative. For example, the holder 32 is molded from a synthetic resin such as ABS resin. A peripheral part of the holder half 32 is formed by a flat rectangular frame. A semicircular recess 33, a groove portion 34 on one end of the semicircular recess 33, and a projecting portion 36 which forms a groove 35 on the opposite end of the semicircular recess 33, are provided at a central part of the holder half 32. The semicircular recess 33 is used to hold the base 3 and a cylindrical portion of the cover 4 of the semiconductor package 1. The groove portion 34 is used to receive the flange 6 of the semiconductor package 1. The groove 35 is used to receive an edge of a sidewall of a metal casing which will be described later. As shown in FIG. 4B, the groove portion 34 is only formed at the side portion on the right and left, and a rear surface side of the peripheral portion of the semicircular recess 33 is open. In addition, the groove 35 is formed along the front surface of the flat rectangular frame as shown in FIG. 4C.

Inside the flat rectangular frame, a penetration space 37 is formed on both sides of the semicircular recess 33. Engaging projections 38 and engaging depressions 39 are provided at diametrical positions on the sides of the semicircular recess 33, along the penetration spaces 37. Each engaging projection 38 confronts the corresponding engaging depression 39. An engaging claw 41 is provided on a tip end of each engaging projection 38. A recess 42 with a stepped portion is provided at two positions on each of the two sides of the flat rectangular frame. The recesses 42 receive engaging projections of the metal casing which will be described later, so as to position the metal casing.

Figure 5A:
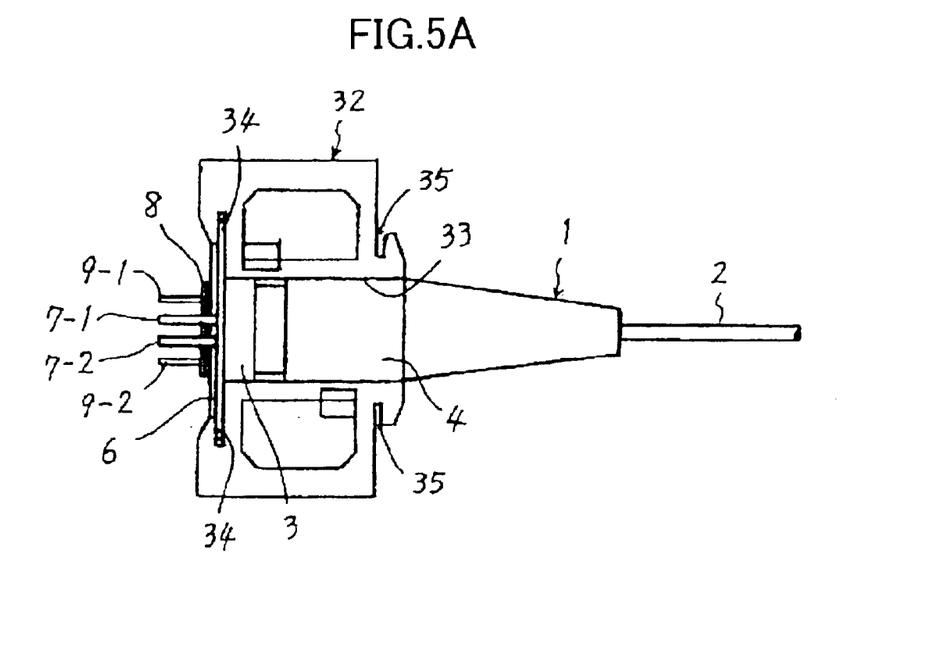
FIGS. 5A and 5B are diagrams for explaining a process of assembling a semiconductor package on a holder.
Figure 5B:
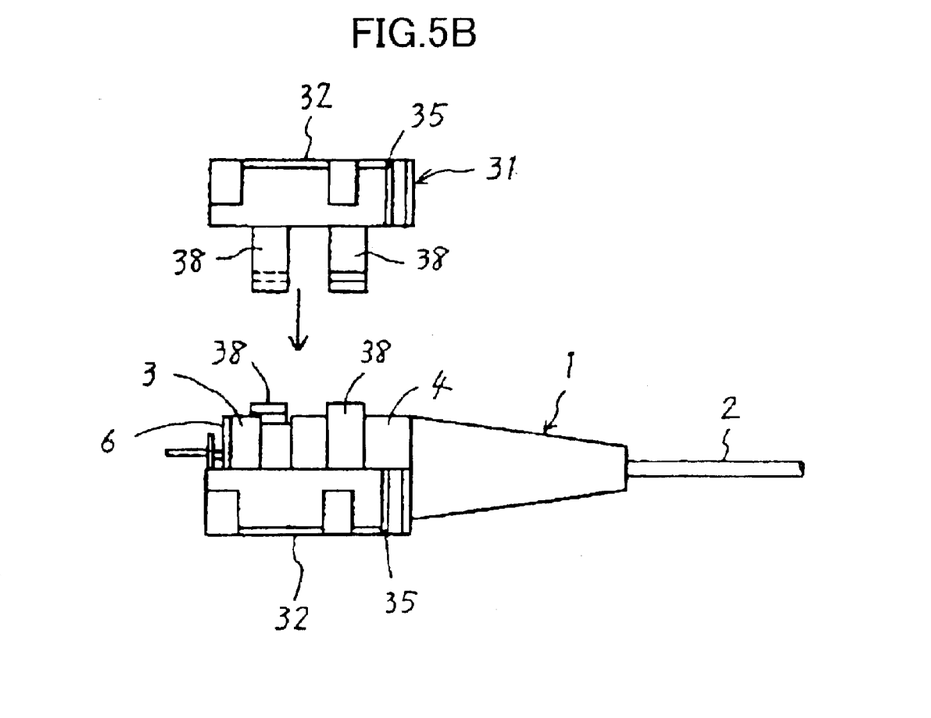

FIGS. 5A and 5B are diagrams for explaining a process of assembling the semiconductor package 1 and the holder 31 which is formed by the holder halves 32 described above. First, as shown in a plan view of FIG. 5A, the base 3 of the semiconductor package 1 and the cylindrical portion of the cover 4 are fit into the semicircular recess 33 of a first holder half 32. In this state, the flange 6 of the base 3 fits into the groove portion 34 and is positioned thereby. In other words, the semiconductor package 1 is positioned so as not to move in an axial direction and so as not to turn about the axis, relative to the first holder half 32. As a result, the terminals 7 (7-1 through 7-4) and 9 (9-1 and 9-2) and the terminal plate 8 project via a central opening of the groove portion 34.

Next, as shown in a side view of FIG. 5B, a second holder half 32 is fit onto the first holder half 32 which holds the semiconductor package 1 in the state shown in FIG. 5A, in a direction indicated by an arrow in FIG. 5B. Because the first and second holder halves 32 have the same structure, the first and second holder halves 32 will have symmetrical structures when the two holder halves 32 confront each other. Hence, the first and second holder halves 32 can easily be fit and connected to each other.

In other words, when the second holder half 32 is fit onto the first holder half 32, the exposed base 3 of the semiconductor package 1 and exposed the cylindrical portion of the cover 4 fit into the semicircular recess 33 of the second holder half 32, and the semiconductor package 1 is positioned by the second holder half 32. Therefore, the entire periphery of the base 3 of the semiconductor package 1 and the entire periphery of the cylindrical portion of the cover 4 are positively held by the semicircular recesses 33 of the first and second holder halves 32, while the entire periphery of the flange 6 of the base 3 is positively held by the groove portions 34 of the first and second holder halves 32. As a result, the semiconductor package 1, which is sandwiched between the first and second holder halves 32, is positioned so as not to move in the axial direction and so as not to turn about the axis, relative to the first and second holder halves 32.

When the first and second holder halves 32 are connected, the engaging projections 38 of the first holder half 32 engage the corresponding engaging depressions 39 of the second holder half 32, and the engaging projections 38 of the second holder half 32 engage the corresponding engaging depressions 39 of the first holder half 32. The engaging claw 41 of each engaging projection 38 first resiliently deforms outwards and then returns to the original position to positively engage the corresponding engaging depression 39 and achieve a locking-engagement.

Figure 6A:
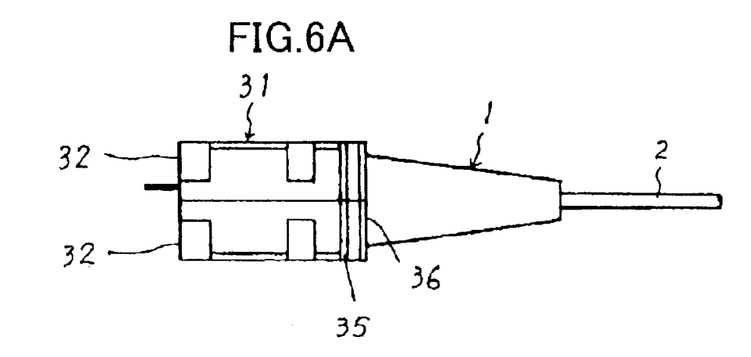
FIGS. 6A through 6C are diagrams for explaining the process of assembling the semiconductor package on the holder.
Figure 6B:
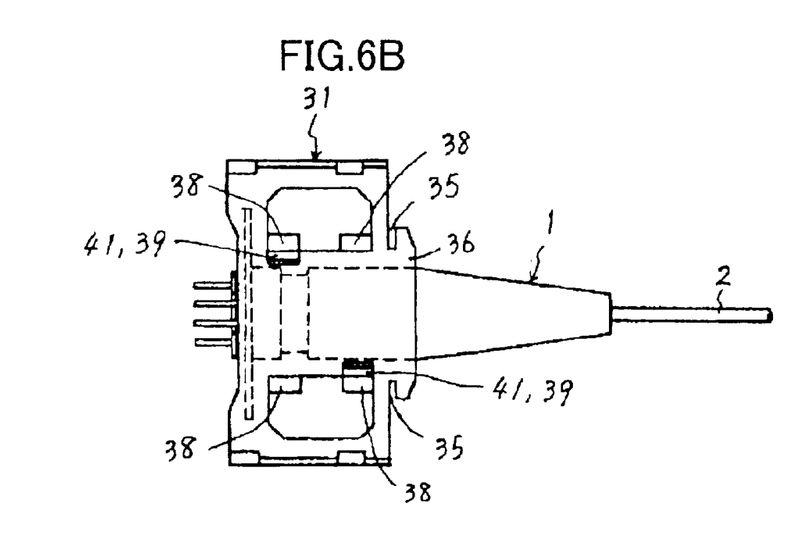
Figure 6C:
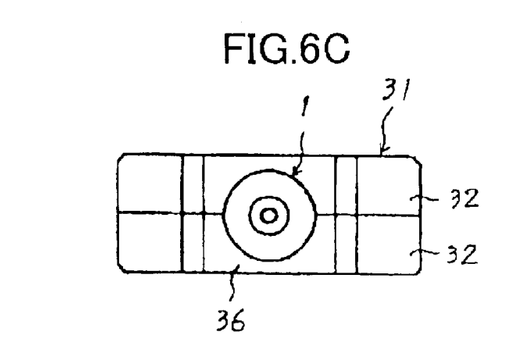

FIGS. 6A through 6C are diagrams for explaining the process of assembling the semiconductor package 1 on the holder 31, and show a state where the holder halves 32 are connected as described above. FIG. 6A shows a side view of this state, FIG. 6B shows a plan view of this state, and FIG. 6C shows a front view of this state. The metal portions of the semiconductor package 1, that is, the base 3 and the flange 6, are completely covered by and positively held by the holder 31.

The holder 31 which is made up of the connected pair of holder halves 32 has a generally parallelepiped shape. The semiconductor package 1 is positioned and held within the holder 31. Except for the projecting portion 36 which forms the groove 35, no projecting portion exists on the periphery of the holder 31. In addition, the semiconductor package 1 is automatically positioned and positively held by the holder 31 by simply connecting the two holder halves 32, without requiring special equipments or tools.

Figure 7A:
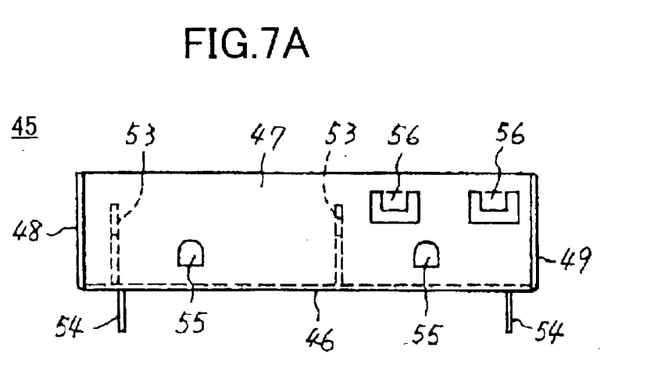
FIGS. 7A through 7C are diagrams showing a metal casing.
Figure 7B:
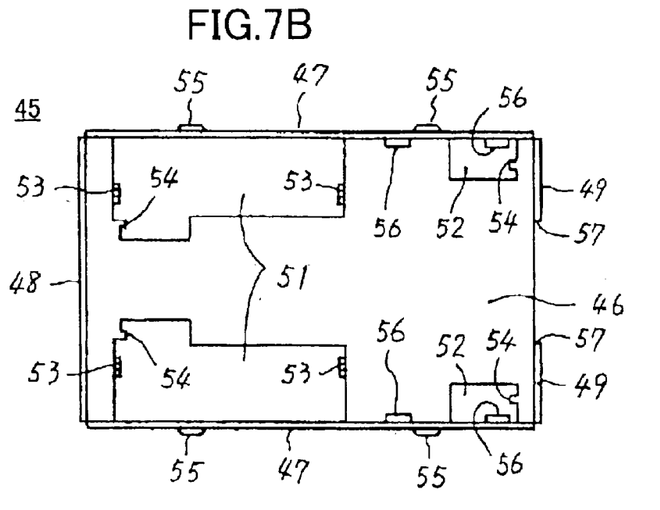
Figure 7C:
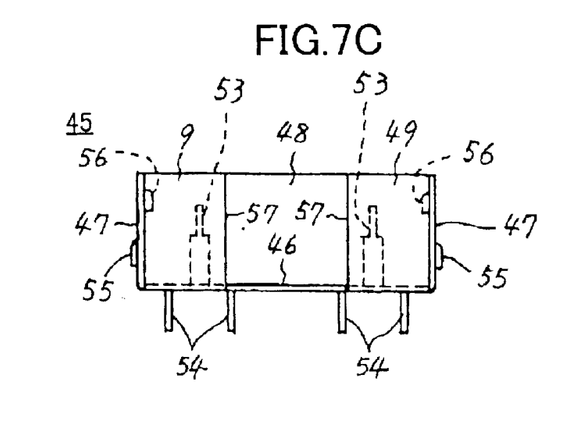

FIGS. 7A through 7C are diagrams showing a metal casing 45. FIG. 7A shows a side view of the metal casing 45, FIG. 7B shows a plan view of the metal casing 45, and FIG. 7C shows a front view of the metal casing. The metal casing 45 includes a bottom surface (bottom plate) 46, a pair of sidewalls 47 on both sides, a rear wall 48, and a front wall 49.

A pair of large first penetration holes 51 and a pair of small second penetration holes 52 are provided in the bottom surface 46 along the sidewalls 47. A stepped projection 53 and a mounting projection 54 are provided along the respective edges of each first penetration hole 51, at approximately confronting positions in the plan view shown in FIG. 7B. The stepped projection 53 is provided along the edge of the first penetration hole 51 closer to the front, and is used for mounting a printed circuit board. The stepped projection 53 stands upwardly in FIG. 7A. On the other hand, the mounting projection 54 is provided along the edge of the first penetration hole 51 closer to the rear, and is used for mounting the metal casing 45. The mounting projection 54 extends downwardly in FIG. 7A.

A pair of engaging projections 55 is press-molded on each of the two sidewalls 47 of the metal casing 45. In each sidewall 47, one engaging projection 55 is arranged closer to the front and the other engaging projection 55 is arranged closer to the rear, with both engaging projections 55 being located close to the bottom surface 46 and projecting outwards of the metal casing 45. Furthermore, as shown in FIG. 7A, a pair of engaging projections 56 are provided on each sidewall 47 so as to project inwards. The engaging projections 56 are located above the engaging projection 55 in the side view in FIG. 7A.

A pair of parallel edges 57 extend to the bottom surface 46, so as to form a cutout at a central portion of the front wall 49.

The metal casing 45 is formed by bending a plate member such as a steel plate. The entire metal casing 45 is subjected to a suitable rust-proofing process, such as nickel plating, which permits soldering thereon.

Figure 8A:
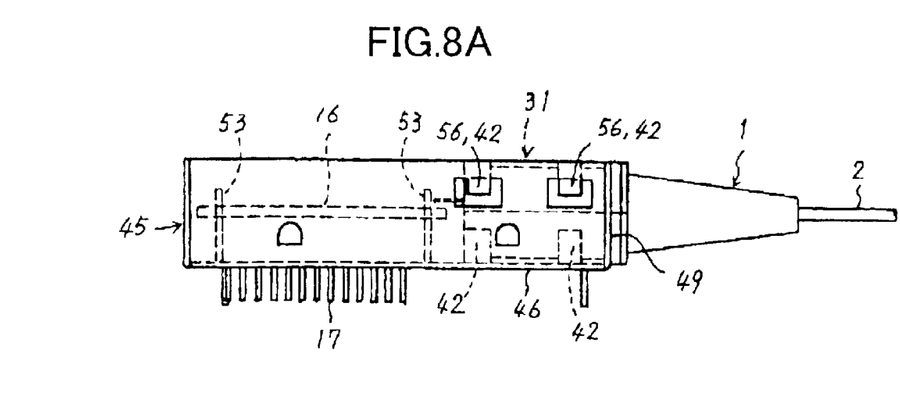
FIGS. 8A through 8C are diagrams for explaining a process of assembling the semiconductor package on the metal casing.
Figure 8B:
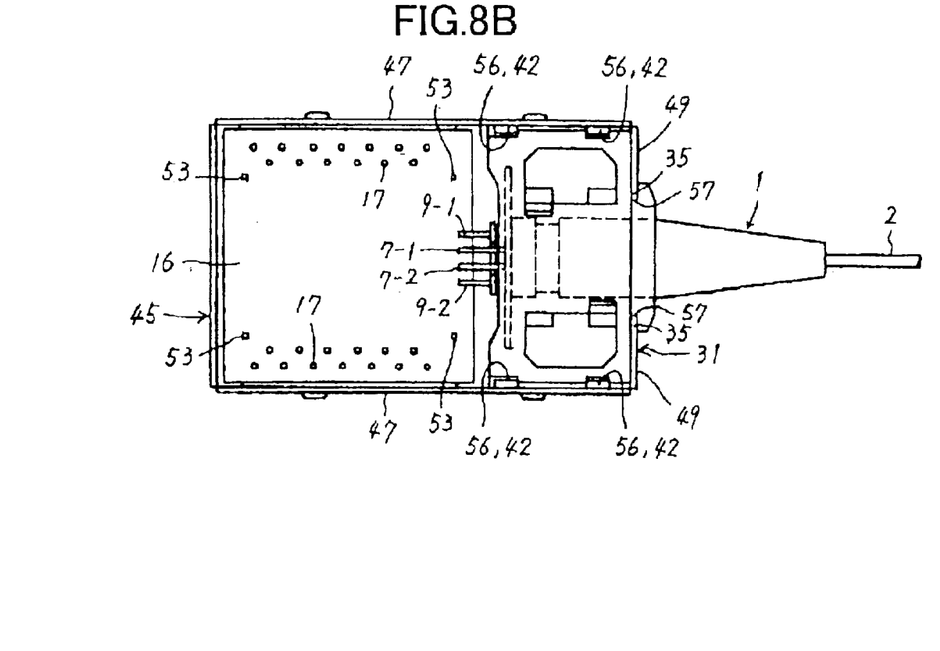
Figure 8C:
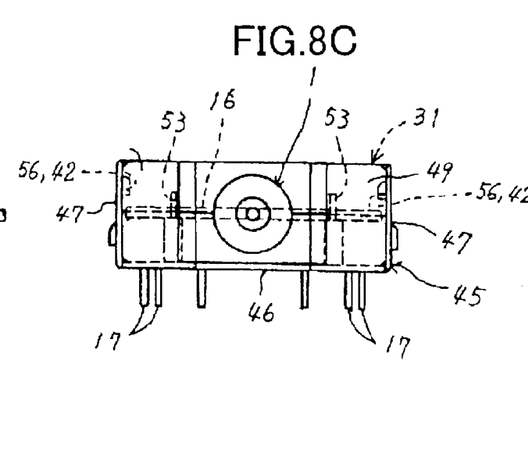

FIGS. 8A through 8C are diagrams for explaining a process of assembling the semiconductor package 1 on the metal casing 45. More particularly, FIGS. 8A through 8C show an assembled structure obtained by assembling of the semiconductor package 1 which is held by the holder 31 described above in conjunction with FIGS. 6A through 6C on the metal casing 45, and with the printed circuit board 16 mounted in the metal casing 45. FIG. 8A shows a side view of the assembled structure, FIG. 8B shows a plan view of the assembled structure, and FIG. 8C shows a front view of the assembled structure.

First, the printed circuit board 16 is mounted in the metal casing 45 in the following manner. That is, the stepped projections 53 extending upwards from the bottom surface 46 of the metal casing 45 in FIG. 8A are inserted into the corresponding through holes in the conductor patterns on the printed circuit board 16, and tip ends of the stepped projections 53 are soldered to the conductor patterns in the vicinities of the through holes and fixed. As a result, the printed circuit board 16 is positioned by the stepped portions of the stepped projections 53 to the position shown in FIGS. 8A and 8C. In this state, the lead terminals 17 arranged along both sides of the printed circuit board 16 project outwards from the bottom surface 46 of the metal casing 45 via the first penetration holes 51 in the bottom surface 46. Although the printed circuit board 16 actually includes various conductor patterns printed thereon and various circuit elements or parts mounted thereon, the illustration of the conductor patterns and the circuit elements or parts is omitted in FIGS. 8A through 8C so as to simplify the drawings.

Next, the semiconductor package 1 which is held by the holder 31 in the state shown in FIGS. 6A through 6C is inserted into an internal space of the metal casing 45 to confront the front portion of the printed circuit board 16. This is achieved by engaging the grooves 35 of the holder 31 to the parallel edges 57 of the front wall 49 of the metal casing 45, and sliding the holder 31 along the parallel edges 57. Since the holder 31 also makes sliding contact with the sidewalls 47 of the metal casing 45 as the holder 31 slides along the parallel edges 57, the holder 31 is automatically and stably positioned with respect to the metal casing 45.

As the holder 31 slides along the sidewalls 47 of the metal casing 45, the engaging projections 56 on the sidewalls 47 resiliently deform the sidewalls 47 outwards and then fit into the corresponding recesses 42 of the holder 31 as the sidewalls 47 return to the original states. Hence, the holder 31 is locked with respect to the metal casing 45 and is prevented from easily disengaging from the metal casing 45. At the same time, the lower surface of the holder 31 is positively positioned with respect to the bottom surface 46 of the metal casing 45.

Therefore, the assembled structure shown in FIGS. 8A through 8C can be assembled by a simple process which requires no special equipments or tools. In addition, the assembling process can be carried out while automatically positioning the holder 31 (which holds the semiconductor package 1) with respect to the metal casing 45. Of course, when inserting the holder 31 into the metal casing 45, the holder 31 should be approximately parallel to the metal casing 45, and the terminals 7 and 9 of the semiconductor package 1 should overhang the surface of the printed circuit board 16 in the mounted position, so as to allow soldering of the terminals 7 and 9 onto the circuit patterns on the printed circuit board 16.

In the assembled state of the assembled structure shown in FIGS. 8A through 8C, the top edges of the sidewalls 47, the rear wall 38 and the front wall 49 matches the top surface of the holder 31, so that the holder 31 does not project above the top edges in the side view of FIG. 8A.

When removing the semiconductor package 1 from the metal casing 45, the sidewalls 47 may be resiliently deformed towards the outside, and the solder on the terminals 7 and 9 removed, so that the holder 31 can easily be removed from the metal casing 45 by sliding the holder 31 upwards in FIG. 8A. Therefore, both the mounting and removal of the semiconductor package 1 with respect to the metal casing 45 can be made by a relatively simple process.

Figure 9A:
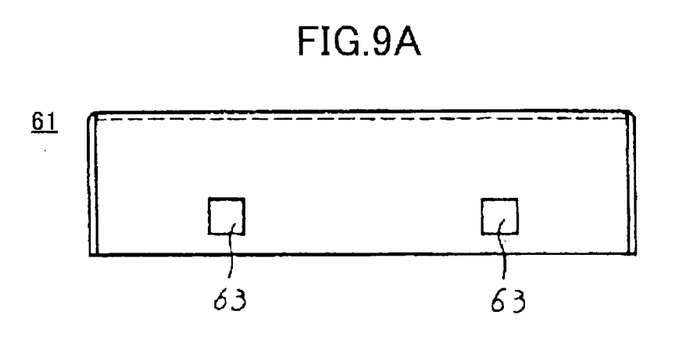
FIGS. 9A through 9C are diagrams showing a metal cover.
Figure 9B:
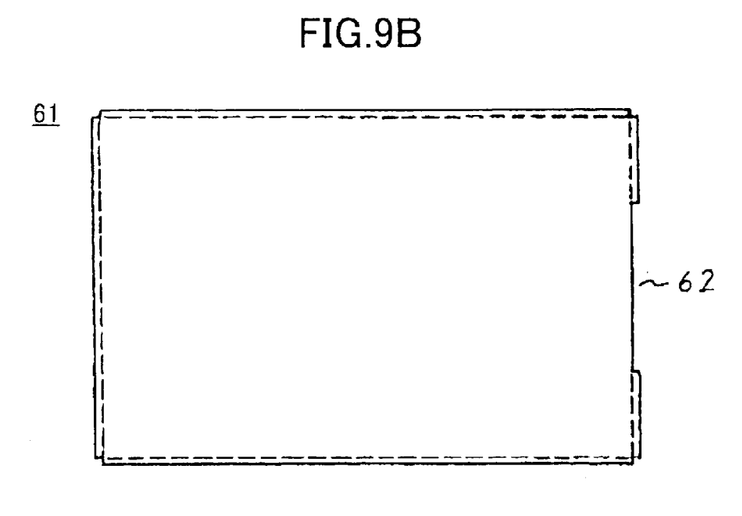
Figure 9C:
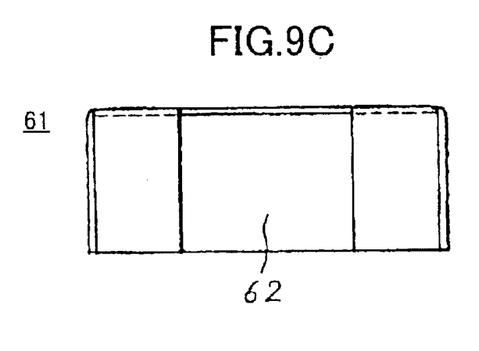

FIGS. 9A through 9C are diagrams showing a metal cover 61. FIG. 9A shows a side view of the metal cover 61, FIG. 9B shows a plan view of the metal cover 61, and FIG. 9C shows a front view of the metal cover 61. The metal cover 61 has a box shape which is formed by bending four sides of a plate member such as a steel plate, similarly to the metal casing 45. A cutout 62 for permitting the semiconductor package 1 and the holder 31 to project towards the front side, and rectangular holes 63 for receiving the engaging projections 55 on the sidewalls of the metal casing 45 are formed in the metal cover 61. The metal cover 61 is subjected to a suitable rust-proofing process.

Figure 10A:
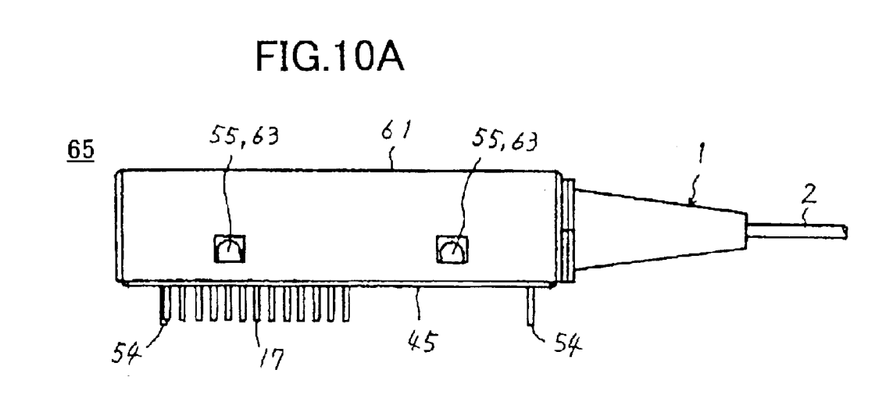
FIGS. 10A through 10C are diagrams showing an embodiment of an optical module according to the present invention.
Figure 10B:
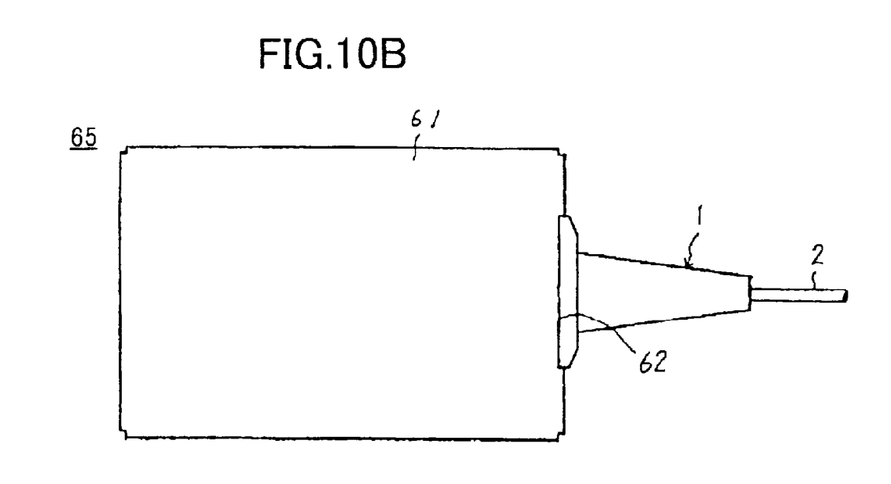
Figure 10C:
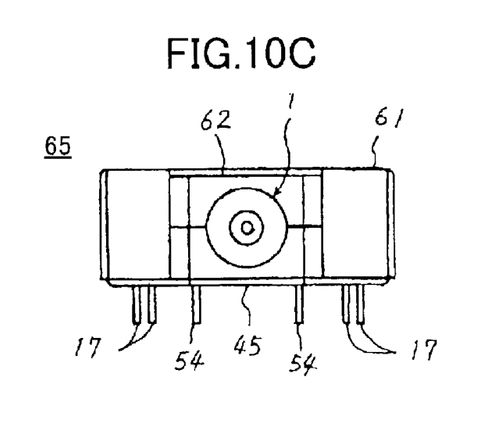

FIGS. 10A through 10C are diagrams showing an embodiment of an optical module according to the present invention. In other words, FIGS. 10A through 10C show the metal cover 61 shown in FIGS. 9A through 9C mounted on the assembled structure shown in FIGS. 8A through 8C. Similarly to FIGS. 8A through 8C and FIGS. 9A through 9C, FIG. 10A shows a side view of an optical module 65, FIG. 10B shows a plan view of the optical module 65, and FIG. 10C shows a front view of the optical module 65.

The metal cover 61 has an internal surface shape which suitably matches an outer surface shape of the metal casing 45 when the metal cover 61 is fitted on the metal casing 45. Hence, when the metal cover 61 is slid and fitted on the metal casing 45, the metal cover 61 connects to the metal casing 45 as shown in FIGS. 10A and 10B. When the metal cover 61 is connected to the metal casing 45, all of the engaging projections 55 of the metal casing 45 engage the corresponding rectangular holes 63 in the metal cover 61, so as to positively hold the metal cover 61 and the metal casing 45 together. In this connected state, the tip end of the semiconductor package 1 projects towards the front side of the metal cover 61 via the cutout 62. The metal cover 61 can be removed from the metal casing 45 by outwardly spreading the sidewalls of the metal cover 61 and pulling the metal cover 61 with respect to the metal casing 45.

When mounting the optical module 65 on the printed circuit board or the like of the apparatus, the mounting terminals 54 of the metal casing 45 and the lead terminals 17 of the printed circuit board 16 are inserted into corresponding through holes in the printed circuit board of the apparatus. The terminals 14 and 17 are then soldered to wiring patterns on the printed circuit board of the apparatus.

The semiconductor package 1 is of course not limited to that which is simply provided with a semiconductor optical element, and the semiconductor package 1 may include a light emitting element and a light receiving element so as to enable a bi-directional optical transmission, for example.

Moreover, the material forming the holder 31 is not limited to the synthetic resin, and any suitable material may be used. For example, when the holder 31 is made of a metal, at least portions of the holder 31 which contact the metal parts of the semiconductor package 1 such as the base 3 and the flange 6 is made electrically insulative. Such portions of the holder 31 can be made electrically insulative by coating an electrically insulative material such as a synthetic resin layer.

Further, the present invention is not limited to these embodiments, but various variations and modifications may be made without departing from the scope of the present invention.

What is claimed is:

1. An optical module comprising:

a semiconductor package;

a holder holding the semiconductor package; and a metal casing having a bottom surface, first and second confronting sidewalls, and third and fourth confronting sidewalls, said first sidewall having a pair of parallel edges defining a cutout extending to the bottom surface, said metal casing and said holder being separate bodies, said metal casing accommodating a printed circuit board, said holder being accommodated within the metal casing on the bottom surface in a state where the metal casing is positioned by the pair of parallel edges, the third and fourth sidewalls and the bottom surface, so that the semiconductor package extends outside the metal casing via the cutout, and confronts said printed circuit board.

2. The optical module as claimed in claim 1, wherein said holder is made up of a pair of holder halves having identical structures, and said semiconductor package is sandwiched between the pair of holder halves.

3. The optical module as claimed in claim 1, wherein said semiconductor package includes metal portions, and said holder is electrically insulative at least at portions making contact with the metal portions of the semiconductor package.

4. The optical module as claimed in claim 1, wherein said holder has first engaging portions, and the third and fourth sidewalls of said metal casing have second engaging portions which engage the first engaging portions in a locked position in a state where said holder is accommodated within said metal casing.

5. The optical module as claimed in claim 1, further comprising:

a printed circuit board having wiring patterns and mounted within said metal casing, said semiconductor package accommodating at least an optical element and having terminals extending within said metal casing and an optical fiber extending out of said metal casing via the cutout, said terminals being soldered onto the wiring patterns.

6. The optical module as claimed in claim 5, wherein said terminals overhang a surface of said printed circuit board provided with the wiring patterns.

7. The optical module as claimed in claim 6, wherein said printed circuit board includes terminals extending outside said metal casing through the bottom surface.

8. An optical module comprising:

a semiconductor package having a metal base, a flange and a semiconductor light emitting element which outputs an optical signal;

a holder holding a periphery of the metal base of said semiconductor package; and a metal casing having a bottom surface and four sidewalls to accommodate a printed circuit board and said holder together with said semiconductor package, so that said semiconductor package confronts said printed circuit board, one of the sidewalls having a pair of parallel edges defining a cutout extending to the bottom surface, said metal casing and said holder being separate bodies, said holder being made up of a pair of holder halves sandwiching said semiconductor package, each of said holder halves having a recess which positions the flange of said semiconductor package, a groove which receives the pair of parallel edges of said metal casing, and engaging portions which engage corresponding engaging portions of the other holder half when the pair of holder halves connect to form said holder, said holder being electrically insulative at least at portions making contact with the metal base of said semiconductor package.

9. The optical module as claimed in claim 8, wherein said holder is also electrically insulative at portions making contact with the flange of said semiconductor package.

10. An optical module comprising:

a semiconductor package having a metal base, a flange and a semiconductor light emitting element which outputs an optical signal;

a holder holding a periphery of the metal base of said semiconductor package; and a metal casing having a bottom surface and four sidewalls to accommodate a printed circuit board and said holder together with said semiconductor package, so that said semiconductor package confronts said printed circuit board, one of the sidewalls having a pair of parallel edges defining a cutout extending to the bottom surface, said metal casing and said holder being separate bodies, said holder being made up of a pair of holder halves made of a synthetic resin and sandwiching said semiconductor package, each of said holder halves having a recess which positions the flange of said semiconductor package, a groove which receives the pair of parallel edges of said metal casing, and engaging portions which engage corresponding engaging portions of the other holder half when the pair of holder halves connect to form said holder.

11. The optical module as claimed in claim 10, wherein said holder is positioned within said metal casing by two confronting sidewalls and the bottom surface.

12. An optical module comprising:

a semiconductor package having a metal base, a flange and a semiconductor light emitting element which outputs an optical signal;

a holder holding a periphery of the metal base of said semiconductor package; and a metal casing having a bottom surface and four sidewalls to accommodate a printed circuit board and said holder together with said semiconductor package, so that said semiconductor package confronts said printed circuit board, one of the sidewalls having a pair of parallel edges defining a cutout extending to the bottom surface, said metal casing and said holder being separate bodies, said holder being made up of a pair of holder halves sandwiching said semiconductor package, each of said holder halves having a recess which positions the flange of said semiconductor package, a groove which receives the pair of parallel edges of said metal casing, and engaging portions which engage corresponding engaging portions of the other holder half when the pair of holder halves connect to form said holder, said holder being electrically insulative at least at portions making contact with metal portions of said semiconductor package and including the flange of said semiconductor package.

13. The optical module as claimed in claim 12, wherein said holder is positioned within said metal casing by two confronting sidewalls and the bottom surface.

14. An optical module comprising:

a holder, to hold a metal base of a semiconductor package, made up of a pair of holder halves to simplify an assembly process thereof; and a metal casing to resist electromagnetic noise, accommodate a printed circuit board and said holder, and position said holder so that said semiconductor package confronts said printed circuit board, said metal casing and said holder being separate bodies, and said holder being accommodated within said metal casing and electrically insulating said metal base from said metal casing.

15. An optical module, comprising:

a printed circuit board;

a metal casing accommodating the printed circuit board;

a semiconductor package with a metal base; and a holder, accommodated within the metal casing, and electrically insulating the metal base of the semiconductor package from the metal casing, and comprising a pair of interconnecting holder halves to simplify an assembly process thereof, wherein the metal casing positions the holder so that the semiconductor package confronts the printed circuit board.

16. The optical module according to claim 15, wherein the holder halves are identical.

17. The optical module according to claim 15, wherein the holder halves are symmetrical when confronting each other.

18. The optical module according to claim 15, wherein the metal casing provides protection from electromagnetic noise to the printed circuit board and the semiconductor package.

19. The optical module according to claim 15, wherein:

the metal casing has a cutout; and the holder is disposed within the metal casing such that the semiconductor package extends outside the metal casing via the cutout.

20. An optical module including a semiconductor package with a metal base, the optical module comprising:

a holder comprising a pair of mutually interconnecting holder halves to simplify an assembly process thereof; and a metal casing, separate from the holder
accommodating a printed circuit board,
protecting the printed circuit board and the semiconductor package from electromagnetic noise, and
having a cutout, and accommodating the holder within the metal casing such that the semiconductor package extends outside the metal casing via the cutout, and the semiconductor package confronts the printed circuit board, wherein the holder electrically insulates the metal base from the metal casing.

* * * * *